United States Patent
Liu

(10) Patent No.: US 6,574,024 B1
(45) Date of Patent: Jun. 3, 2003

(54) LASER BEAM HOMOGENIZATION BY SCANNING A BEAM ONTO A MASK

(75) Inventor: Xinbing Liu, Acton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/541,019

(22) Filed: Mar. 31, 2000

(51) Int. Cl.⁷ .............................................. G02B 26/08
(52) U.S. Cl. ...................... 359/212; 359/199; 359/201; 359/202; 359/214
(58) Field of Search ................................ 359/196–202, 359/212–215, 221, 227, 234–236, 900; 219/121.7, 121.71

(56) References Cited

U.S. PATENT DOCUMENTS

| | | |
|---|---|---|
| 5,168,454 A | 12/1992 | LaPlante et al. |
| 5,296,673 A | 3/1994 | Smith |
| 5,676,866 A | 10/1997 | In den Baumen et al. |
| 5,750,956 A * | 5/1998 | Barnes et al. ........... 219/121.71 |
| 5,965,043 A * | 10/1999 | Noddin et al. ......... 219/121.71 |
| 6,038,075 A | 3/2000 | Yamazaki et al. |
| 6,040,552 A | 3/2000 | Jain et al. |

* cited by examiner

Primary Examiner—James Phan
(74) Attorney, Agent, or Firm—RatnerPrestia

(57) ABSTRACT

Apparatus that homogenizes a laser beam, in applications where multiple laser pulses are used to drill holes in a work piece by projecting an image of a mask onto the work piece, scans the laser beam across the mask to achieve substantially equal laser fluence through each opening in the mask. Any non-uniform beam illumination is averaged out during the multiple pulse drilling process. One embodiment of the invention uses a mirror mounted on a motor such that the reflecting surface of the mirror is at an angle to a plane which is perpendicular to the axis of rotation of the motor. This embodiment traces a circular path on the mask. Another embodiment of the invention employs two galvo mirrors to scan the laser beam. The first galvo mirror is configured to reflect the laser beam on to the second galvo mirror and the second galvo mirror is configured to reflect the laser beam onto the mask, wherein each of the first and second galvo mirrors rotates about a rotational axis in the plane of its mirror. By mounting the galvo mirrors to have orthogonal axes of rotation, this apparatus can trace the laser beam in an arbitrary pattern across the mask.

10 Claims, 5 Drawing Sheets

LASER BEAM HOMOGENIZATION BY SCANNING A BEAM ONTO A MASK

BACKGROUND OF THE INVENTION

The present invention concerns laser machining apparatus and in particular apparatus that homogenizes laser illumination on a mask that is used in a projection imaging system for drilling holes in materials with multiple laser pulses.

Many types of laser drilling application project an image of a mask pattern onto the work piece by laser beam illumination. One such system is shown in U.S. Pat. No. 6,040,552 to Jain et al. entitled HIGH-SPEED DRILLING SYSTEM FOR MICRO-VIA PATTERN FORMATION AND RESULTING STRUCTURE. In this system, a laser beam illuminates a planar mask containing a pattern of open and opaque areas. The pattern of open areas (referred to from this point on as the mask) is imaged by a lens system on to the work piece surface. The pattern that is defined by the open areas of the mask is then drilled in the work piece. If the linear magnification of the imaging lens is M, the pattern on the work piece is magnified in a linear dimension by a factor of M.

The laser beam has a finite transverse size, characterized by its beam diameter. For most lasers, the transverse laser light does not have a uniform intensity. Typically, the intensity of the laser beam can be modeled as a two-dimensional Gaussian distribution, with the highest intensity at the center of the beam and lower intensities toward the edge of the beam. For laser drilling with projection imaging, a uniform laser intensity distribution at the work piece is desired so that the drilled holes are uniform. To insure uniform illumination of the mask, the mask is either much smaller than the laser beam, or, as in the above-referenced patent, the beam is transformed to a more uniform transverse intensity distribution before illuminating the mask. The process of transforming the laser beam is known as beam homogenization or beam shaping. Typical beam homogenization systems, such as that used in the above-referenced patent employ optics that change the light distribution of the laser beam.

SUMMARY OF THE INVENTION

The present invention is embodied in a method and apparatus to homogenize a laser beam in applications where multiple pulses are used for drilling in a projection imaging arrangement. As used herein, the term "multiple pulse drilling" means that the image of the mask remains relatively stationary on the work piece surface over the firing of a plurality of laser pulses. According to the subject invention, a mechanical device scan the beam over a mask to illuminate a larger area of the mask than the beam size on the mask. Any non-uniform beam illumination is averaged out during the multiple pulse drilling process.

According to one aspect of the invention, the beam of laser light pulses has a central portion and a peripheral portion and the beam homogenizing apparatus moves the beam of laser light pulses in a pattern on the work piece such that, over a plurality of laser pulse intervals, each aperture is exposed to the central portion and to the peripheral portion of the laser beam.

According to another aspect of the invention, the beam homogenizing apparatus is a mirror that reflects the beam of laser light pulses onto the mask. The mirror has a planar reflecting surface mounted on the shaft of a motor which rotates around an axis and the mirror is mounted to the motor shaft such that the plane of the mirror is at an angle to a plane that is perpendicular to the axis of rotation.

According to another aspect of the invention, the beam homogenizing apparatus includes two galvo mirrors. The first galvo mirror is configured to reflect the laser beam on to the second galvo mirror and the second galvo mirror is configured to reflect the laser beam onto the mask. Each of the first and second galvo mirrors rotates about a rotational axis in a plane that is parallel to the plane of its mirror.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
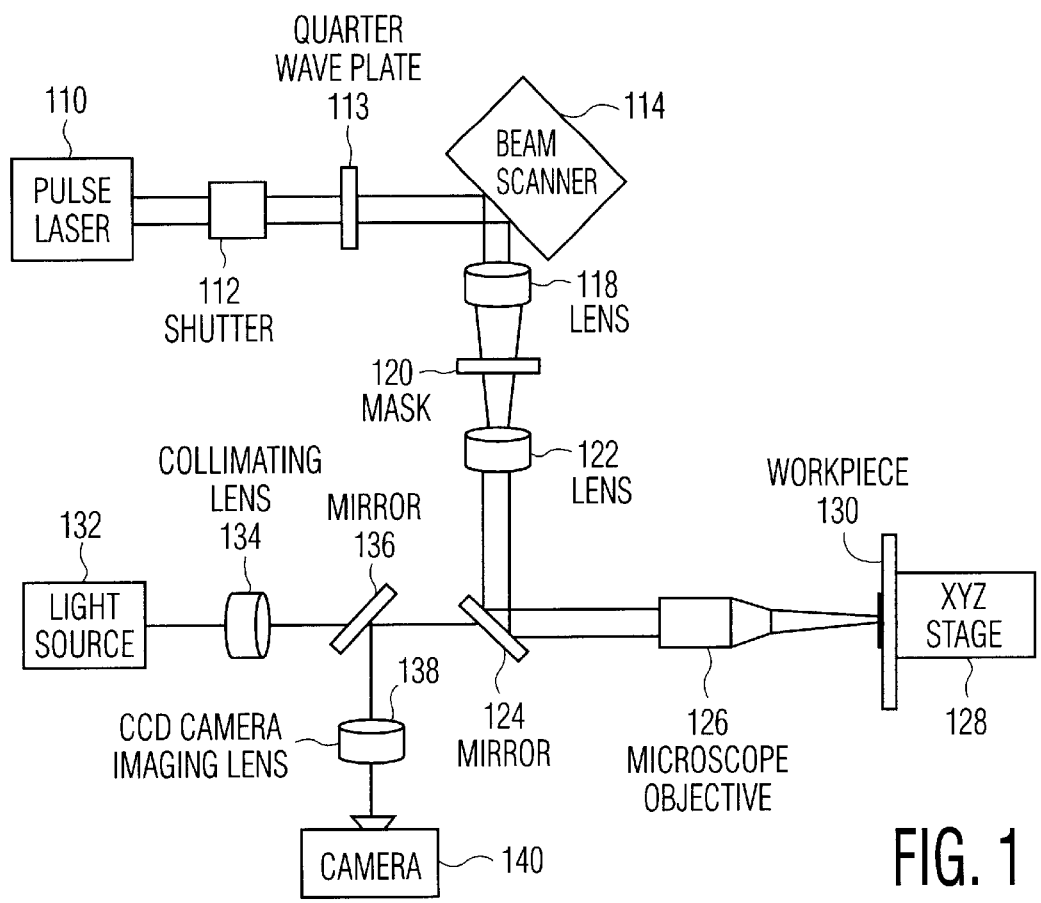
FIG. 1 is a block diagram of a laser machining system that includes an embodiment of the present invention.

An exemplary micromachining system according to the present invention is shown in FIG. 1. The laser beam from a laser 110 is first passed through a mechanical shutter 112. This shutter allows the beam to be turned off, for example when the work piece is being moved, without turning off the laser 110. The laser beam provided by the shutter is passed through a quarter-wave plate 113. The quarter-wave plate 113 changes the polarization of the laser beam from linear to circular polarization, which the inventors have determined is desirable for drilling round holes. The circularly polarized beam is then reflected from a beam scanner 114, described below. The reflected beam is then passed through a lens 118 to increase the laser fluence on the mask 120. It is contemplated that the lens 118 may be placed between the quarter wave plate 113 and the beam scanner 114 instead of being between the beam scanner 114 and the mask 120.

The imaging of the mask onto the work piece is realized by a two-lens system including lenses 122 and 126. The mask is placed approximately in the focal plane of the lens 122, and the work piece is placed in the focal plane of the lens 126. In the exemplary apparatus, a half-silvered turning mirror 124 is placed between the lenses 122 and 126.

Using this lens system, the image magnification ratio is given by the ratio of the focal length of the two lenses, $M=f_2/f_1$. This imaging arrangement collimates the beam between the two imaging lenses, and, so, is not sensitive to the separation of the two lenses. The work piece 130 is mounted on an XYZ translation stage 128. The exemplary stage 128 is controlled by a computer, which also controls and synchronizes the shutter 112 so that the beam is not projected onto the work piece is 130 when the work piece is being moved. The XYZ translation stage 128 is used instead of an XY translation stage to be able to adjust the position of the work piece to place the surface of the work piece that is to be ablated at the focal plane of the lens 126. Thus, during the machining process, the translation stage 128 may step in the Z direction to place the surface of the work piece 130 or the bottom surface of the partially ablated hole at or near the focal plane of the lens 126.

The turning mirror 124 before the objective lens allows a microscope imaging setup including CCD camera imaging lens 138 and CCD camera 140 to monitor the drilling process in real time. A fiber-optic coupled lamp, 132 and collimating lens 134 illuminate the sample through the turning mirror 136 and the objective lens 126.

In this exemplary embodiment of the invention, when an ultrashort laser is used, the laser pulse energy is approximately 800 µJ, the pulse width of the beam is approximately 150 femtoseconds and the pulse repetition frequency is approximately 1 kHz to achieve an average power of 0.8 watts. The number of pulses used to form each hole ranges from several tens to several thousands.

The laser fluence on work piece 130 may be varied by changing the position of the lens 118 relative to the mask 120, hence changing the fluence of the laser beam on the mask.

Because the exemplary apparatus shown in FIG. 1 drills multiple holes in parallel, it is important that the laser beam be uniform over the portion of the mask area having the aperture holes. In the exemplary embodiment of the invention, this is achieved in two steps. First, the diameter of the laser beam on the mask 120 is somewhat larger than the diameter of the pattern of aperture holes. Second, the beam scanner 114 operates to homogenize the laser fluence on the work piece by scanning the beam on the mask while the multiple pulses are applied.

Figure 2:
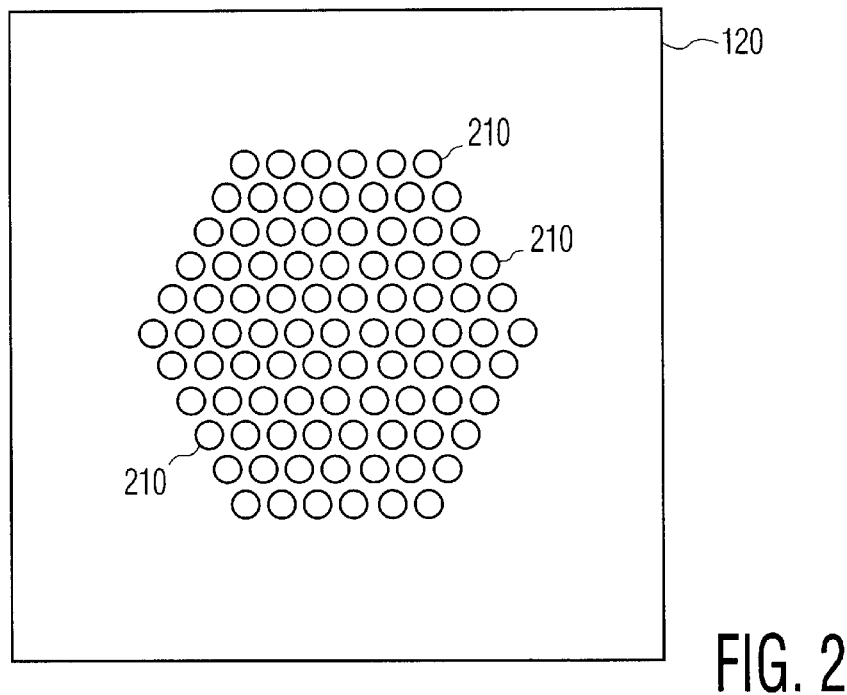
FIG. 2 is a front-plan view of an exemplary mask that may be used with the laser machining system shown in FIG. 1.

FIG. 2 is a front plan diagram of an exemplary mask 120 suitable for use with the subject invention. The exemplary mask 120 is made from a flat, opaque metal foil having a pattern of open apertures 210. The laser beam passes through the apertures 210 but is otherwise blocked by the mask 120. In the exemplary embodiment, the apertures 210 have a diameter of between 10 µm, and 100-µm with 100 to 5000 holes formed in a mask that is between 1 and 2 mm square and 10 to 15 µm thick. This mask, when imaged by the lens system 125, 127, produces holes on the work piece having diameters between 1 µm and 10 µm. In the exemplary mask, the apertures 210 are formed in a hexagonal to minimize the amount of the laser light that is blocked when a circular beam is projected onto the mask.

Figure 3A:
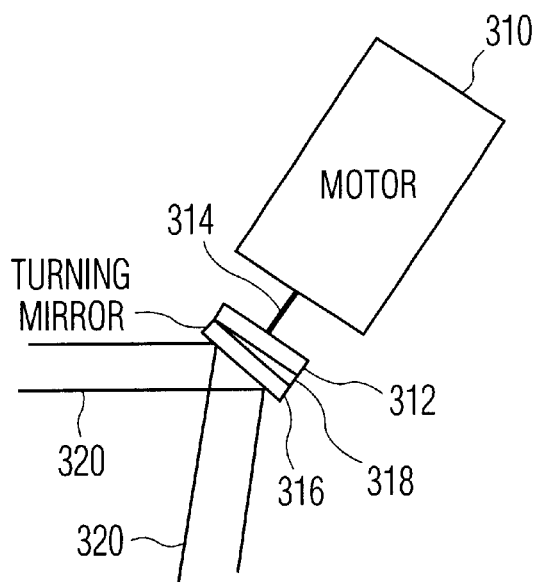
FIGS. 3A and 3B are block diagrams of a first exemplary embodiment of a beam homogenization apparatus according to the present invention.
Figure 3B:
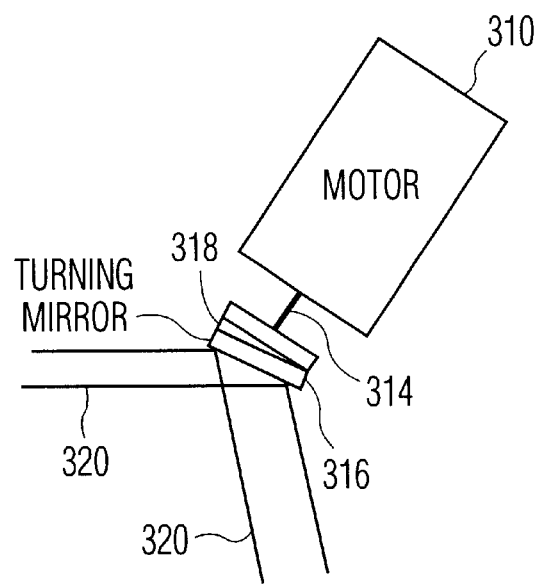

FIGS. 3A and 3B show a first exemplary embodiment of a beam scanner 114 according to the present invention. This first exemplary beam scanner includes a turning mirror 316 mounted on the shaft 314 of a motor 310. The mirror 316 is fixed to a mounting piece 312 that is perpendicular to the motor shaft 314. A wedge 318 separates the mirror 316 from the mounting piece 312 and configures the mirror such that its reflecting surface is not perpendicular to the motor shaft. This configuration of the mirror 316 causes the apparatus shown in FIGS. 3A and 3B to scan the laser beam in a circular pattern over the surface of the mask 120 as the motor turns. As shown in FIGS. 3A and 3B, when the wedge is on one side of the motor, the beam is deflected to the left and when it is on the other side of the motor the beam is deflected to the right. Thus, the laser beam reflected off the mirror exhibit a "wobbling" behavior.

If the scanning device does not function, the laser beam remains stationary on the mask. In the present invention the mask is of comparable size to the laser beam, so the illumination is not uniform over the entire mask (the open area) and the laser drilling at the work piece is not uniform. When the scanning device functions, the laser beam moves over the mask in a predetermined way. The predetermined scanning of the laser beam can be made such that the averaged laser intensity during the multiple pulse drilling process becomes uniform. The effect is then equivalent to a uniform illumination of the mask. Therefore the beam is homogenized over the duration of the multiple pulse drilling operation.

There are different ways of implementing optical beam scanning devices. One simple embodiment is a turning mirror 316 that is mounted on a motor 310, as shown in FIGS. 3A and 3B. The mirror surface is titled with respect to the axis of rotation. As the mirror rotates, the beam that reflects off the mirror also rotates around the axis of rotation. The scanning action is then a circular path on the mask. This is useful when the mask pattern is roughly round, such as the mask pattern shown in FIG. 2. As described above, the pattern area of the exemplary mask has a size of approximately 1.5 mm. If no scanning beam homogenization is implemented, the holes toward the edge of the mask will have less material removed because of lower laser intensity. When the beam is scanned by the above mentioned rotating mirror in a circle with a diameter between 1–1.5 mm, uniformly drilled holes are obtained. The number of pulses used to drill these holes are approximately 2500 at laser pulse repetition frequency of 1 kHz (drilling takes 2.5 seconds). In this exemplary embodiment, the mirror is rotated at a rate of approximately 4 revolutions/sec.

Figure 4:
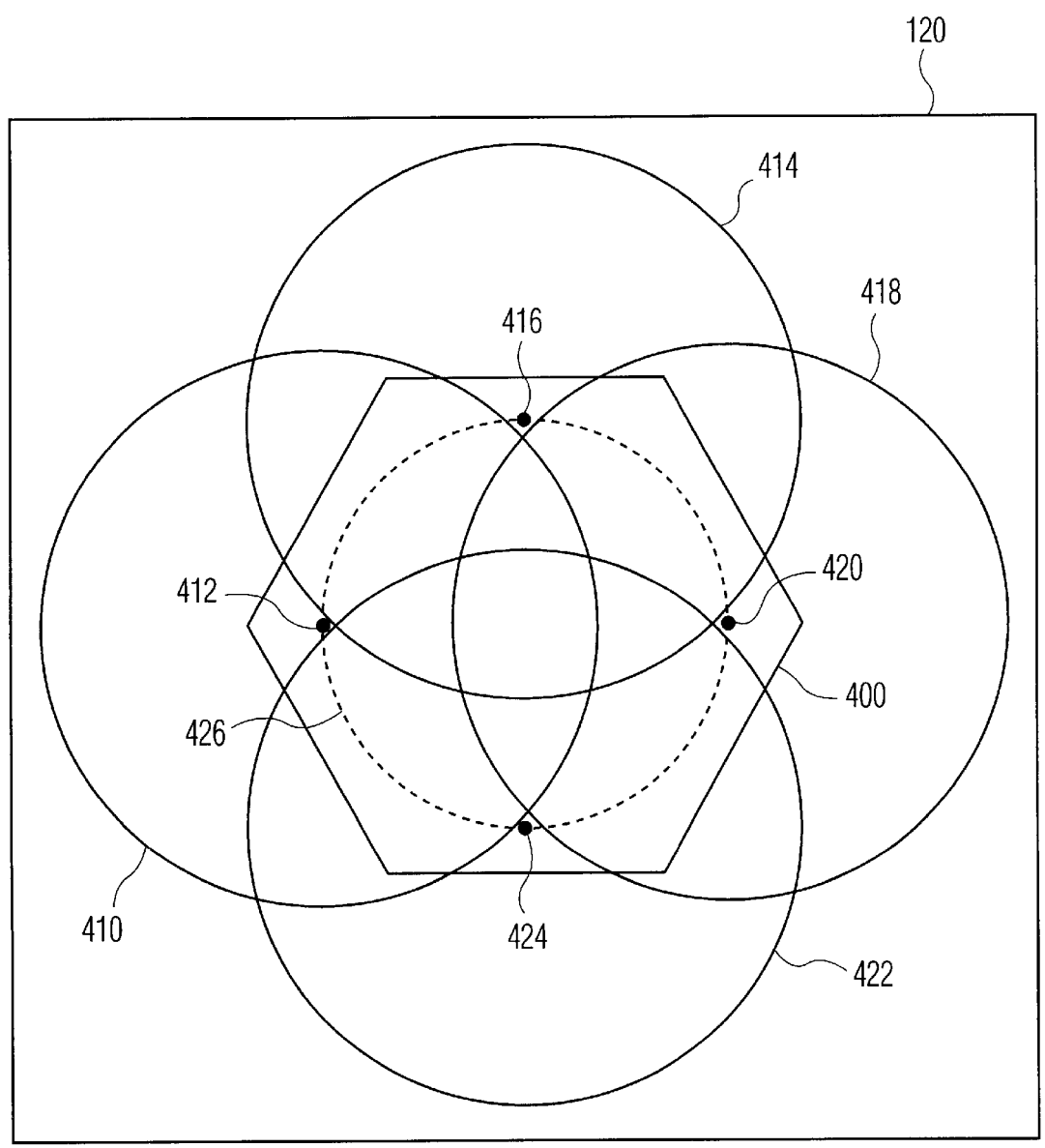
FIG. 4 is a simplified front plan view of the mask shown in FIG. 2 that is useful for describing the operation of the embodiment of the invention shown in FIGS. 3A and 3B.

FIG. 4 is a simplified drawing of the mask 120 that illustrates the scanning method used by the first exemplary scanner. In this drawing, the outline of the mask apertures is shown as the hexagon 400. The circles 410, 414, 418 and 422 illustrate the position of the laser beam on the mask at different rotational positions of the mirror 316. The centers of the laser beams, 412, 416, 420 and 424 fit on a circle 426 that illustrates the path of the laser generated by the scanner.

The scanning device 114 shown in FIGS. 3A and 3B causes the laser beam to trace a circular path on the mask. It is contemplated that other beam scanners that trace different paths may be used. These scanners may be especially useful, for example, when the pattern of apertures in the mask is not roughly circular.

Figure 5:
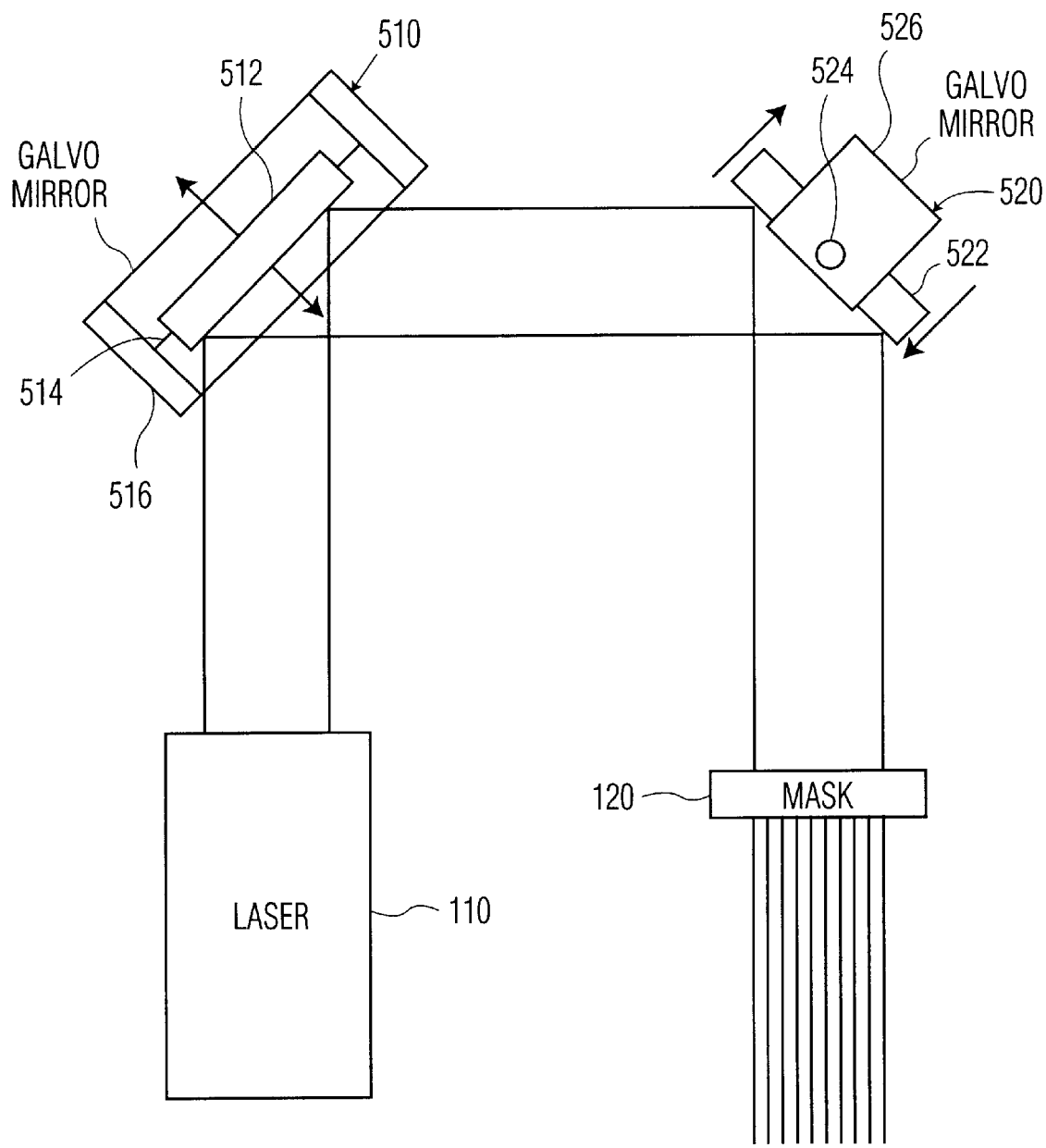
FIG. 5 is a block diagram of a second exemplary embodiment of a beam homogenization apparatus according to the present invention.

Another exemplary beam scanning device is shown in FIG. 5. This beam scanner includes two galvanometer scanning mirrors, also known as galvo-mirrors. The galvo-mirror swings back and forth around an axis that lies in the mirror plane. When the mirrors set up in the can scan the beam in a arbitrary pattern (such as in a laser show for entertainment). A pair of galvo mirrors 510 and 520 are used in this exemplary embodiment of the invention to scan the laser beam over the mask for beam homogenization.

As shown in FIG. 5, a laser produces a beam that is directed to the galvo mirror 510. The mirror includes a housing 516 including an actuator (not shown). The actuator causes a mirror 512 to rotate about an axis 514. The axis 514 may be either in the plane of the reflecting surface of the mirror 512 or in a plane that is parallel to the plane of the mirror. The mirror 512 scans the beam in the vertical direction. The galvo mirror 510 directs the laser beam toward the second galvo mirror 520. The galvo mirror 524 also includes a housing 526 having an actuator (not shown) that causes a mirror 522 to rotate about an axis 524. The galvo mirror 520 scans the laser beam in the horizontal direction. Galvo mirror 520 directs the laser beam toward the mask 120 where it is divided into multiple beams, as described above.

The exemplary scanning structure shown in FIG. 5, may be used to generate many different scanning patterns, as the horizontal and vertical deflection of the laser beam may be controlled independently. As described above, it may be desirable to use different scan patterns for different mask shapes to homogenize the fluence of the laser on the work piece.

Figure 6:
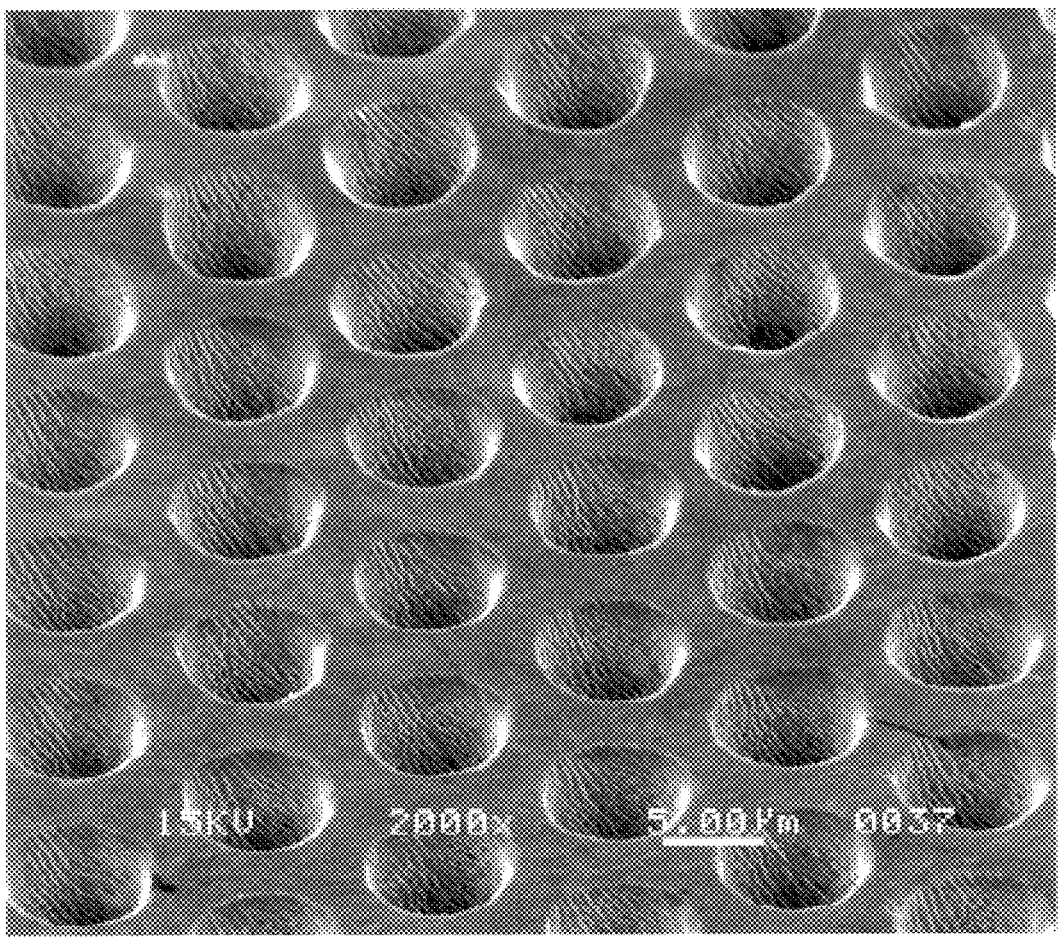
FIG. 6 is a photomicrograph of a microcavity array made with an embodiment of the present invention using an ultrashort pulse laser.

One embodiment of the subject invention uses laser pulses having ultrashort duration to produce an array of micrometer size holes in metal materials. The ultrashort pulse duration minimizes any heat-affected zone surrounding the holes and, thus, any melting during the drilling operation. The result is clean, high quality holes in the metal. FIG. 6 is a photomicrograph that shows holes drilled in a tungsten foil using the exemplary ultrashort laser and a beam homogenization system according to the present invention. As can be seen from FIG. 6, the holes drilled with the ultrashort pulses are substantially free of melted metal, resulting in a clean, highly regular array of microcavity holes.

The present invention homogenizes a laser beam in a simple way. Other laser beam homogenization methods can be complex and difficult. For example, laser beam shaping using diffractive optical elements where an incident beam is transformed into a top-hat beam depends on the actual incident beam amplitude and phase distribution. The result can vary between different lasers. The present invention is insensitive to the details of the incident laser phase distribution.

While the present invention has been described in terms of an exemplary embodiment, it is contemplated that it may be practiced, as described above, with variations that are within the scope of the appended claims.

What is claimed:

1. Apparatus for homogenizing a pulse laser beam for use in a multiple pulse drilling arrangement in which an image of a mask, including a plurality of apertures, is projected on the surface of a work piece, the apparatus comprising;

a mirror configured to reflect the pulse laser beam onto the mask;

wherein the reflected pulse laser beam is projected through at least two apertures simultaneously; and scanning apparatus configured to move the mirror to cause a central axis of the pulse laser beam to trace a pattern on the mask such that, over time, the image of the mask projected on the surface of the work piece exhibits approximately equal intensity among all areas in which the laser light beam is projected, wherein images of the at least two apertures are formed simultaneously on the workpiece.

2. Apparatus according to claim 1, wherein:

the beam of laser light pulses has a central portion and a peripheral portion; and the scanning apparatus is configured to trace the pattern on the work piece such that, over a plurality of laser pulse intervals, each aperture of the mask is exposed to the central portion and to the peripheral portion of the laser beam.

3. Apparatus according to claim 1, wherein the mirror has a planar reflecting surface and the scanning apparatus includes a motor having a shaft that rotates about an axis and the mirror is mounted on the shaft of a motor such that the reflecting planar surface of the mirror is at an angle with respect to a plane that is perpendicular to the axis of rotation of the motor shaft.

4. Apparatus according to claim 1, further including:

a further mirror, configured to reflect the laser light pulses onto the mirror, where each of the mirror and the further mirror has a planar reflecting surface; and the scanning apparatus includes first and second galvanometer scanning actuators coupled to the mirror and the further mirror respectively, wherein each of the first and second galvanometer scanning actuators rotates its respective mirror about a rotational axis in a plane that is parallel to the plane of its mirror.

5. Apparatus according to claim 1, wherein the areas in which the laser light beam is projected on the work piece include a plurality of circular regions having a diameter of approximately 1–10 $\mu$m.

6. A method for homogenizing a pulse laser beam used in a multiple pulse drilling arrangement in which an image of a mask, including a plurality of apertures, is projected on the surface of a work piece, the method comprising the steps of:

reflecting the pulse laser beam onto the mask using a mirror;
wherein the reflected pulse laser beam is projected through at least two apertures simultaneously; and actuating the mirror to cause a central axis of the pulse laser beam to trace a pattern on the mask such that, over time, the image of the mask projected on the surface of the work piece exhibits approximately equal intensity among all areas in which the laser light beam is projected, wherein images of the at least two apertures are formed simultaneously on the workpiece.

7. A method according to claim 6, wherein the beam of laser light pulses has a central portion and a peripheral portion and the step of actuating the mirror causes the pulse laser beam to follow the pattern on the work piece such that, over a plurality of laser pulse intervals, each aperture of the mask is exposed to the central portion and to the peripheral portion of the laser beam.

8. A method according to claim 6, wherein the mirror includes a planar reflecting surface and the step of actuating the includes the step of rotating the mirror about an axis such that the reflecting surface of the mirror is at an angle to a plane that is perpendicular to the axis.

9. A method according to claim 6, wherein:

the step of reflecting the pulse laser beam onto the mask includes the step of reflecting the pulse laser beam from a first planar mirror onto a second planar mirror and reflecting the pulse laser beam from a second mirror onto the mask; and the step of actuating the mirror includes the steps of actuating the first mirror to rotate about a first axis that is parallel to the plane of the first mirror and actuating the second mirror to rotate about a second axis that is parallel to the plane of the second mirror.

10. A method according to claim 6, wherein the areas in which the laser light beam is projected on the work piece include a plurality of circular regions having a diameter of approximately 1–10 $\mu$m.

* * * * *